Jan. 6, 1953     R. A. GRIEFEN     2,624,519
AUTOMATIC MECHANISM FOR WINDING BOBBINS, QUILLS, AND THE LIKE
Filed Jan. 3, 1949     13 Sheets-Sheet 1

*INVENTOR.*
RICHARD A. GRIEFEN

INVENTOR.
RICHARD A. GRIEFEN

Jan. 6, 1953 R. A. GRIEFEN 2,624,519
AUTOMATIC MECHANISM FOR WINDING BOBBINS, QUILLS, AND THE LIKE
Filed Jan. 3, 1949 13 Sheets-Sheet 3

INVENTOR.
RICHARD A. GRIEFEN

Jan. 6, 1953 R. A. GRIEFEN 2,624,519
AUTOMATIC MECHANISM FOR WINDING BOBBINS, QUILLS, AND THE LIKE
Filed Jan. 3, 1949 13 Sheets-Sheet 6

INVENTOR.
RICHARD A. GRIEFEN

Jan. 6, 1953 R. A. GRIEFEN 2,624,519
AUTOMATIC MECHANISM FOR WINDING BOBBINS, QUILLS, AND THE LIKE
Filed Jan. 3, 1949 13 Sheets-Sheet 7
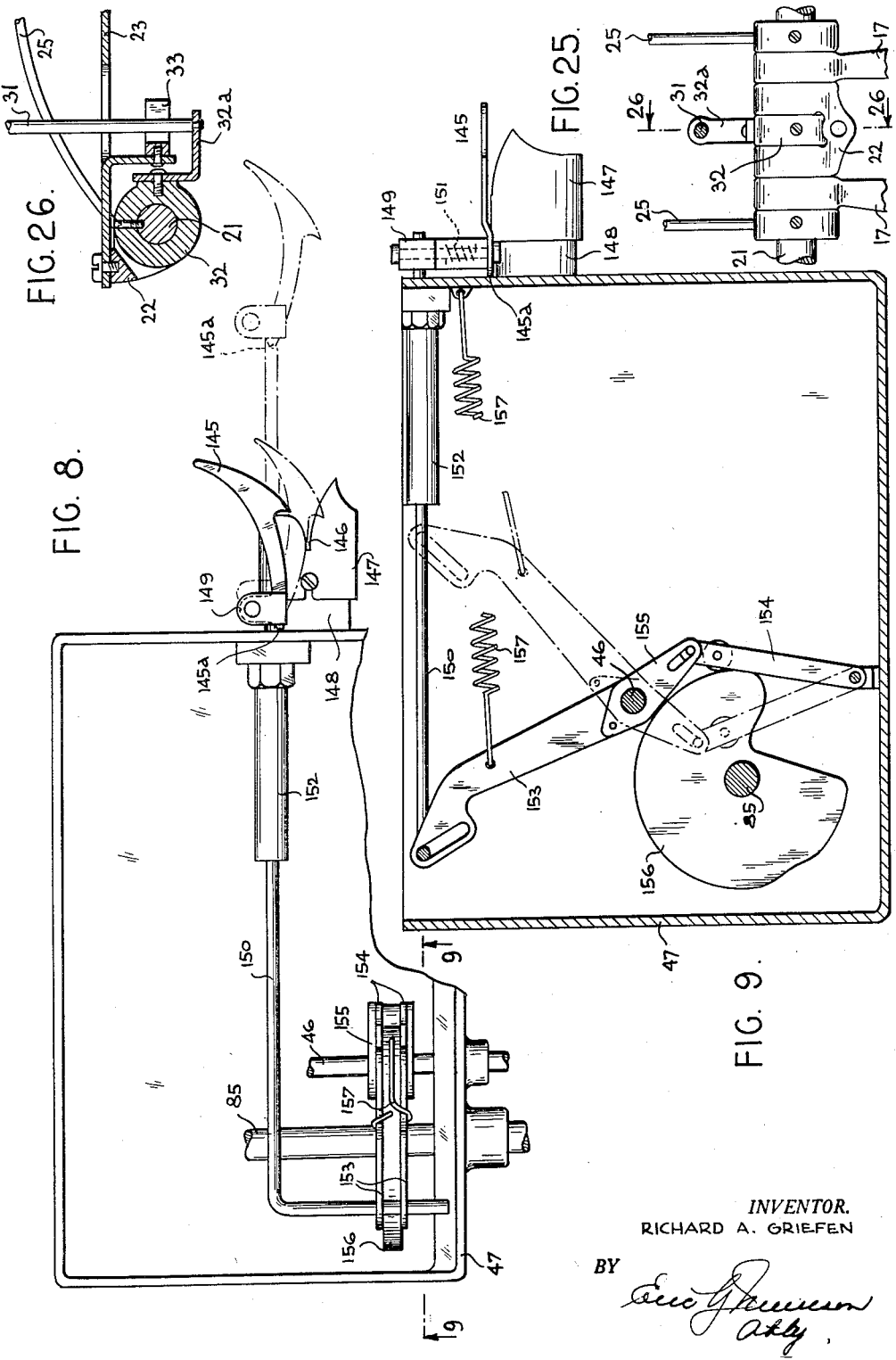
INVENTOR.
RICHARD A. GRIEFEN
BY

INVENTOR.
RICHARD A. GRIEFEN

Jan. 6, 1953 R. A. GRIEFEN 2,624,519
AUTOMATIC MECHANISM FOR WINDING BOBBINS, QUILLS, AND THE LIKE
Filed Jan. 3, 1949 13 Sheets-Sheet 9
FIG. 12.
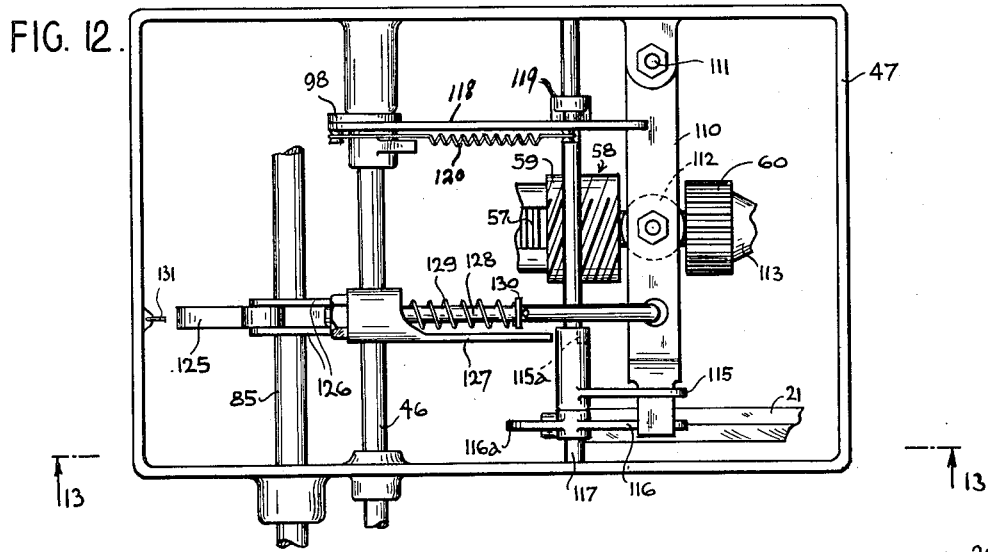
FIG. 13.
FIG. 14.
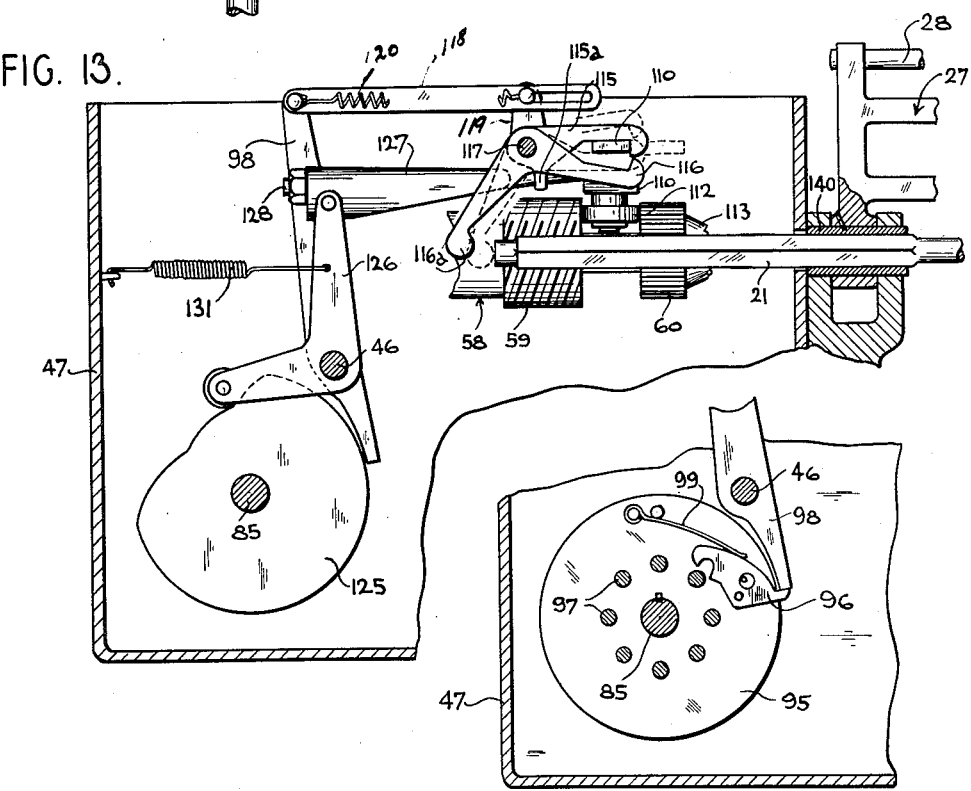
INVENTOR.
RICHARD A. GRIEFEN
BY
Atty.

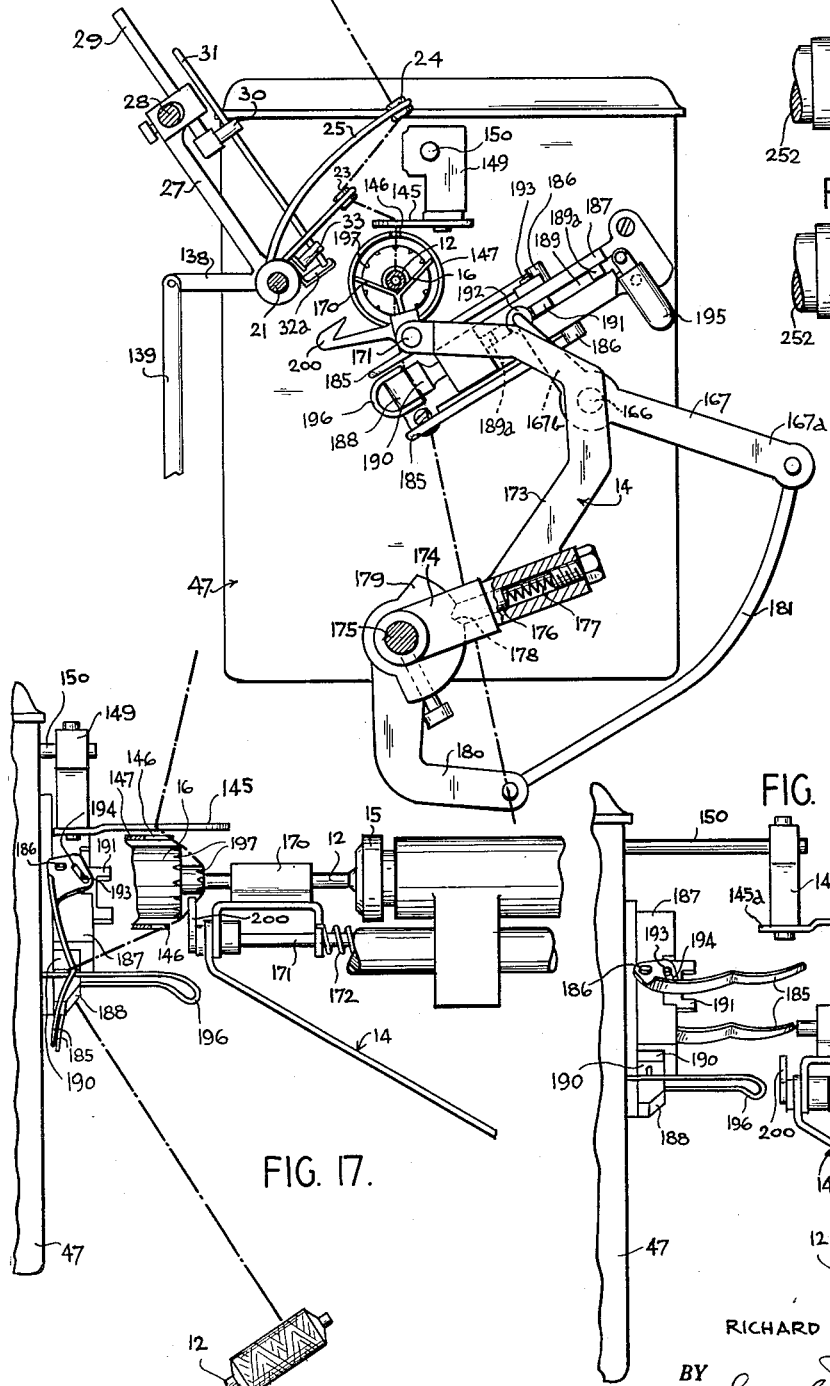
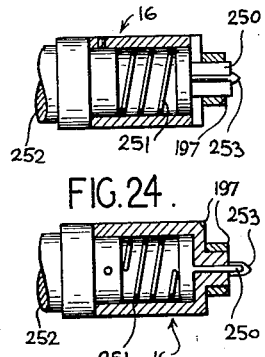
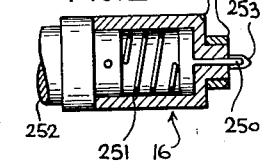
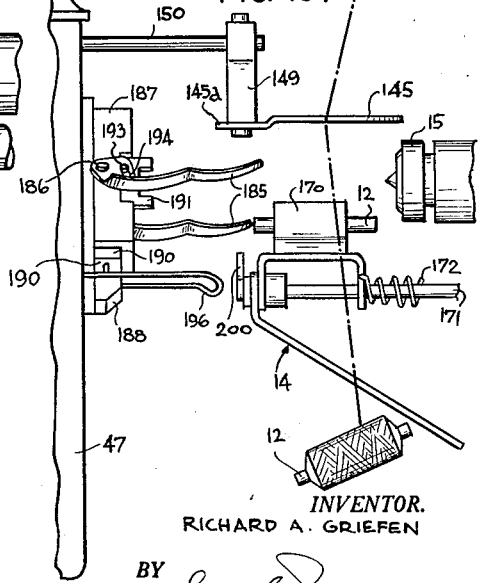

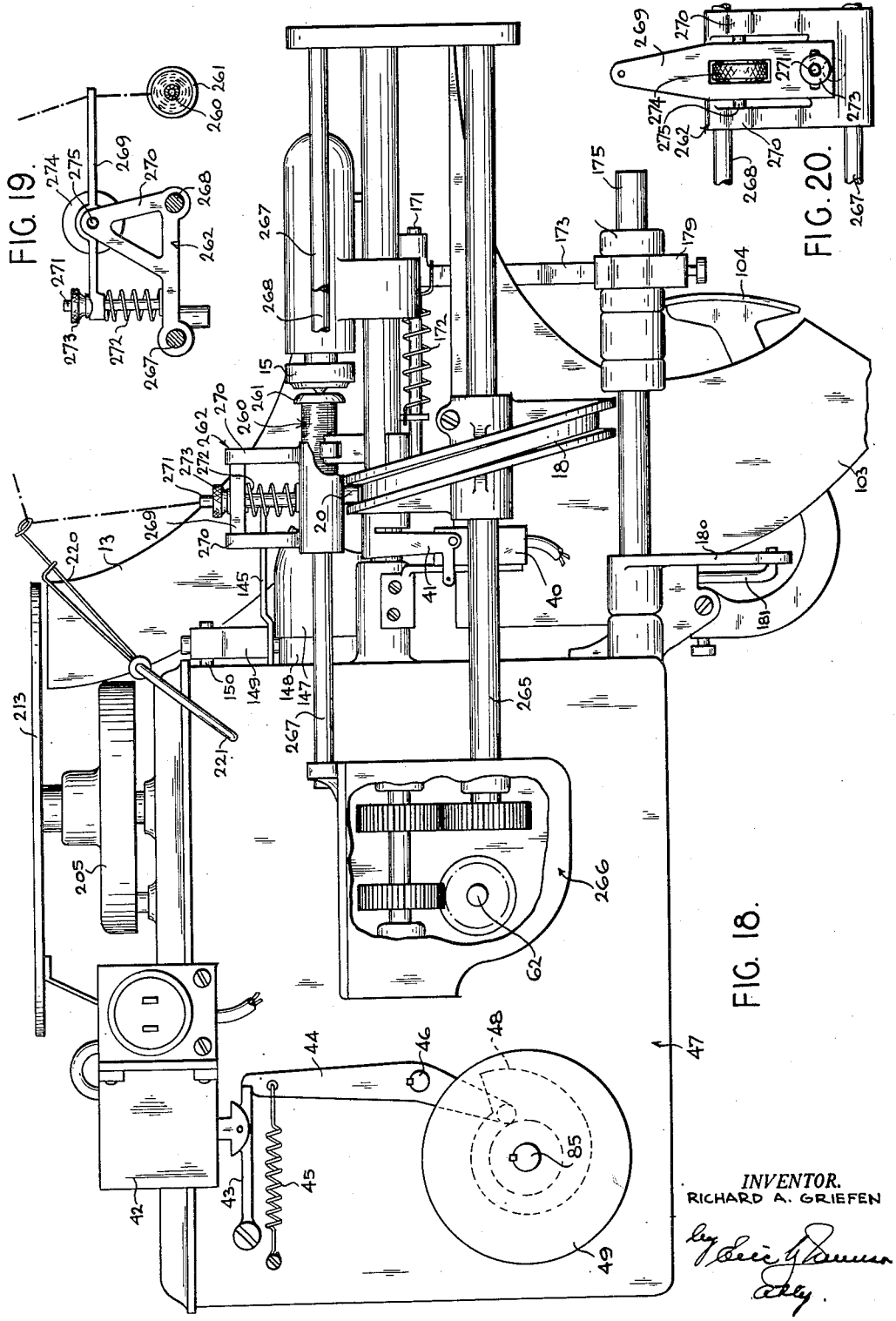

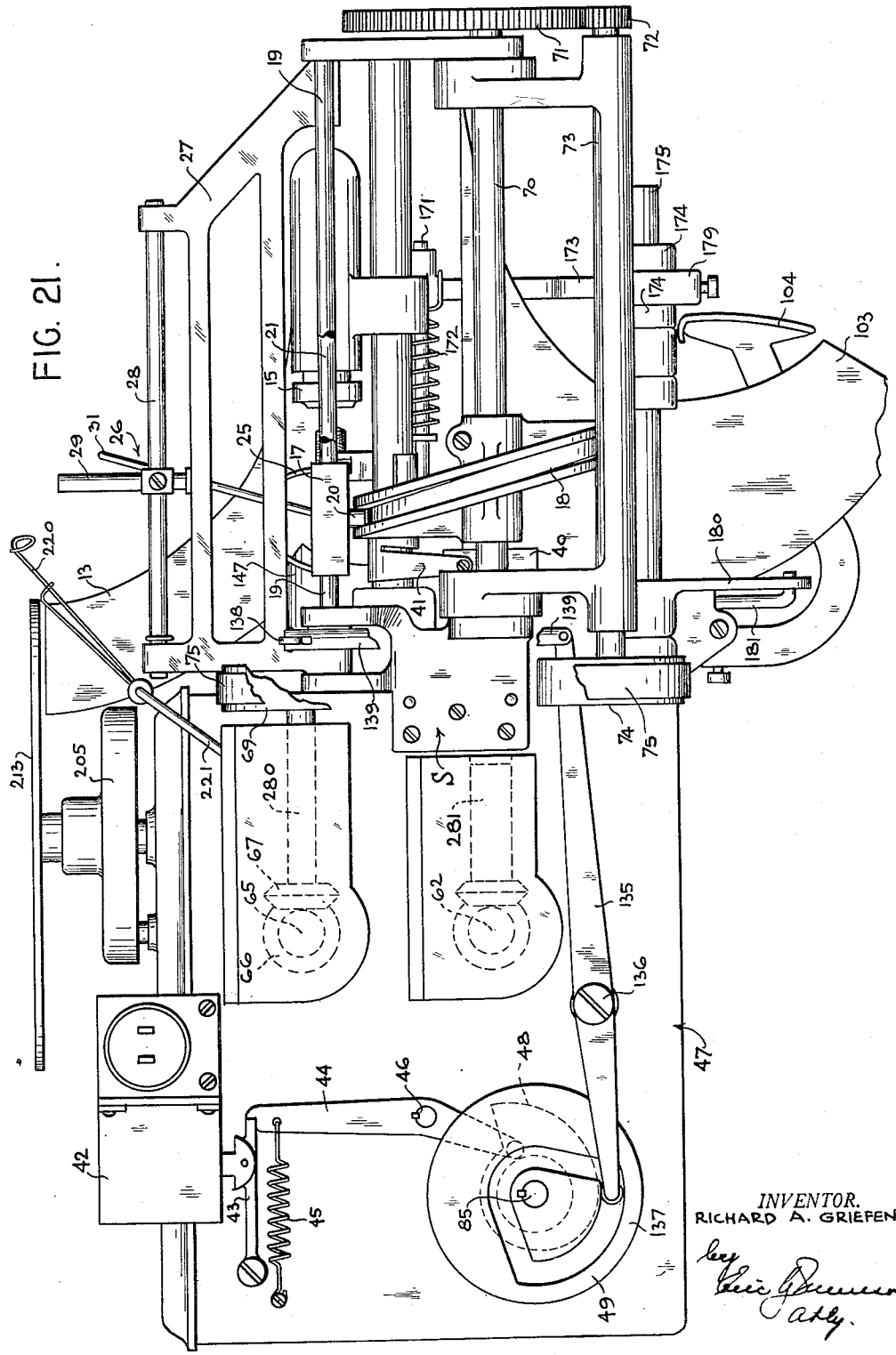

Jan. 6, 1953 R. A. GRIEFEN 2,624,519
AUTOMATIC MECHANISM FOR WINDING BOBBINS, QUILLS, AND THE LIKE
Filed Jan. 3, 1949 13 Sheets-Sheet 13

INVENTOR.
RICHARD A. GRIEFEN

Patented Jan. 6, 1953

2,624,519

UNITED STATES PATENT OFFICE 2,624,519

AUTOMATIC MECHANISM FOR WINDING BOBBINS, QUILLS, AND THE LIKE

Richard A. Griefen, Conshohocken, Pa., assignor to Martin Fabrics Corporation, New York, N. Y., a corporation of New York Application January 3, 1949, Serial No. 68,776

15 Claims. (Cl. 242—39)

This invention relates to improvements in automatic mechanisms for winding bobbins, quills and the like.

It is an object of the present invention to provide improved means for automatically feeding quills to a winding mechanism, securing the free thread end to the quill in starting the winding operation, severing the thread after the quill has been wound, ejecting the wound quill, and positioning a fresh quill, all of the foregoing operations being accomplished in a smooth, continuous and efficient manner.

The invention is of particular merit in connection with quills or bobbins used for weaving narrow fabrics, such as ribbons and tapes, such quills and bobbins necessarily being of shorter length than the conventional shuttle used on broad looms. Furthermore, the yarn or thread is wound to and fro on the quill so that when the yarn is subsequently unwound from the quill, it will traverse the quill from one end to the other. This manner of unwinding the thread or yarn from the quill is essential in connection with narrow fabric looms in order to prevent inadvertent breakage and fouling of the thread because of the rapid and short shuttle strokes.

Heretofore, a machine has been employed for this type of winding operation having a traverse cam operating a thread-guide which reciprocates longitudinally of the quill or bobbin as the latter is rotated during the winding operation. In this type of winder, however, the insertion and removal of the bobbin or quill are effected manually.

Another type of machine generally used inserts the empty bobbin and removes the wound bobbin automatically. However, this latter type of machine has been used heretofore for winding quills for broad looms and the quill or bobbin is wound in a stepwise manner. In other words, the winding operation is initiated at one end of the quill and a portion of the quill is wound and then the thread-guide is gradually advanced to complete the winding operation. Thus the traverse guide in the latter type of winder does not have oscillating or reciprocatory movement.

As has been previously pointed out, the device of the present invention is adapted for winding quills for narrow fabric looms. The automatic sequence of insertion, winding and removal of the quills is accomplished in the preferred embodiment of the invention through the agency of a solenoid trigger-switch which causes the wound quill to be ejected when the quill has been wound to a predetermined thickness. In order to achieve this end, the device includes a contact member which the quill engages when wound to a predetermined thickness; and this contact member in turn energizes the solenoid mechanism which automatically and sequentially actuates the various inter-related mechanisms within the gearbox of the device to cut the thread, eject the quill, reset the mechanism so that the wound quill will be positioned in registration with the quill chute, and insert a fresh quill at the winding station.

Two types of quills are commonly used for narrow fabric looms. One is a quill having flanged ends or the so-called "head quill," and the other is a straight quill without flanges. The device of the present invention can be effectively employed for winding both types of quills.

The foregoing objects of the invention as well as additional objects and advantages will be readily understood in the course of the following detailed description, taken in connection with the accompanying drawings, which illustrate preferred embodiments of the invention, and wherein:

Fig. 8 is a view similar to Fig. 6 but illustrating a different system within the gearbox;

Fig. 9 is a sectional view taken on line 9—9 of Fig. 8;

Fig. 12 is another view similar to Fig. 6 illustrating a fourth system within the gearbox;

Fig. 13 is a sectional view taken on line 13—13 of Fig. 12;

Fig. 14 is a sectional detail view taken on line 14—14 of Fig. 10;

Figs. 15, 16 and 17 are more or less diagrammatic representations of the sequential operations of the machine, wherein the thread is caught, clamped and severed;

Fig. 18 is a front elevational view of a modified form of the invention for producing another type of wound bobbin or quill;

Fig. 19 is a side elevation of the thread-guide of Fig. 18;

Fig. 20 is a top view of the thread-guide;

Figs. 21 and 22 are front elevational views of a further modification of the invention having a pair of interchangeable attachments adapted for producing different types of windings;

Fig. 23 is a fragmentary sectional detail of the retractable chuck;

Fig. 24 is a view similar to Fig. 23 but turned 90°;

Fig. 25 is a top elevational view of the thread guide assembly; and

Fig. 26 is a section taken along the line 26—26 of Fig. 25.

Figure 1:
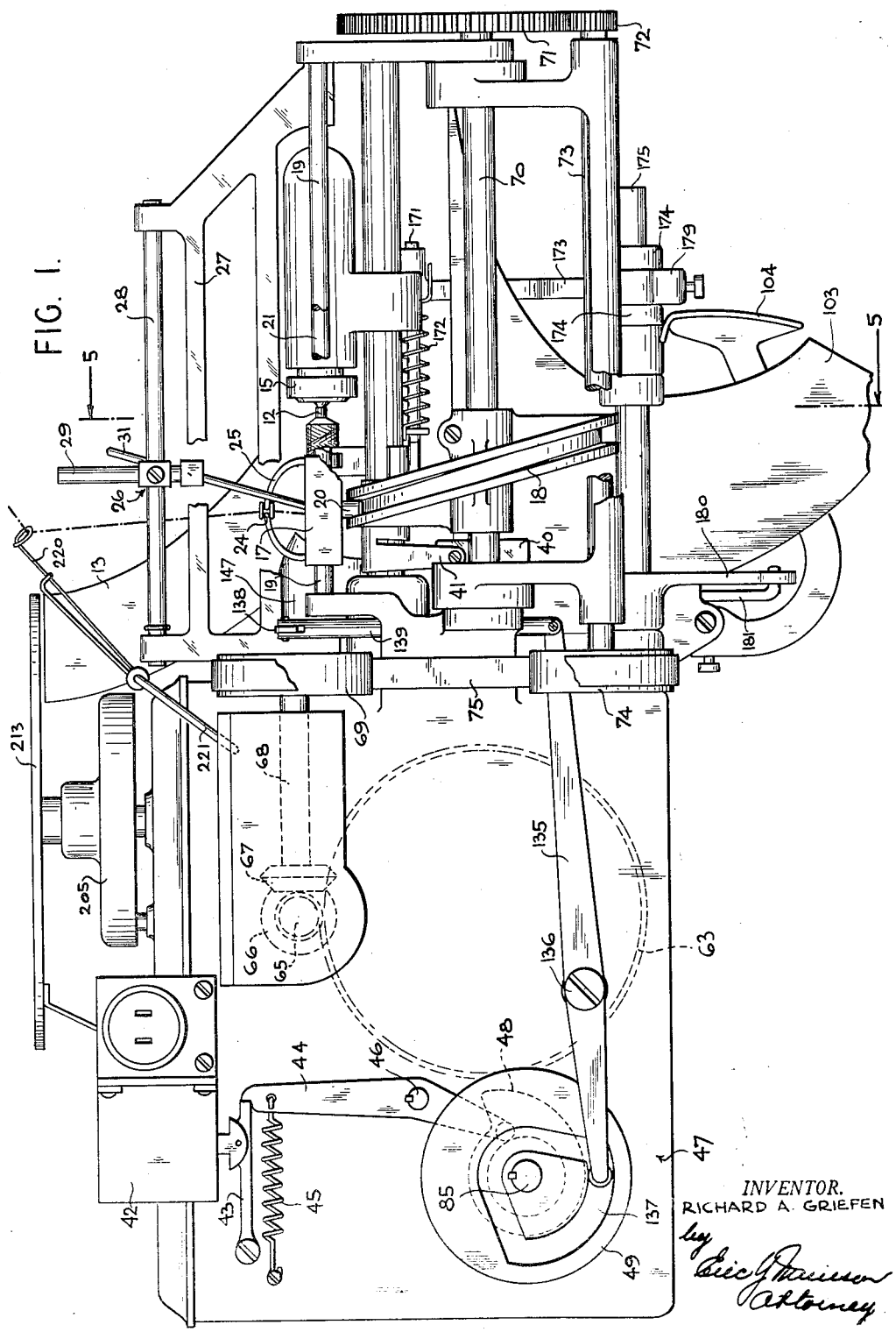
Fig. 1 is a front elevational view of a machine embodying the features of the invention.

The embodiment of the machine illustrated in Figs. 1–17 is particularly adapted for automatically winding straight, flangeless quills or bobbins. In order to clarify the operation of the machine the sequential steps will first be described broadly and a complete description of the various instrumentalities for accomplishing these steps will follow.

Assuming that a fresh quill has been placed in position at the winding station, the machine will operate to wind thread until a predetermined thickness of wind has been achieved. The winding operation is carried out by means of a reciprocating carriage which supports a thread-guide. Since the quill must be wound with tapered ends in order to prevent the thread from loosening, a taper-end attachment is provided which cooperates with the thread-guide to shorten the stroke of the thread-guide as the diameter of the quill increases. At some predetermined thickness a contact member actuates a solenoid trigger-switch which actuates the gear and cam mechanisms of the machine and causes the wound quill to be ejected. At this time the winding-chuck is retracted and the wound quill falls into the quill-chute and against a shutter. The taper-end attachment and the traverse thread-guide are tipped back to allow a thread catching mechanism to pass beneath the thread-guide. The thread catching mechanism then reciprocates longitudinally, carrying the thread into aligned slots in a guide member or shield surrounding the retractable driving chuck. At approximately the same time a carrier having a fresh quill positioned thereupon moves into position at the winding station. A clamping mechanism is then actuated to securely engage the thread prior to its being severed. The driving chuck then advances, clamping the thread against the positioned quill. Following this, the quill carrier retracts and a knife attached thereto cuts the thread, giving a free end to the previously wound quill, after which the clamping mechanism retracts. The quill magazine now advances in order to drop a fresh quill on the carrier. At the same time the chute-shutter opens and the wound quill drops into a suitable receptacle. It will be understood that the foregoing operations are accomplished rapidly and automatically, some of said operations being carried out simultaneously and others overlapping each other.

Referring now to the drawings in greater detail, the machine is provided with a rotary magazine 10, having individual compartments 11 retaining the quills 12. The quills 12 are dropped into a feeding-chute 13 to be deposited on a quill-carrier 14 which places the quill in proper position to be engaged between the tailstock 15 and the driving-chuck 16, as will be more fully described hereinbelow.

Figure 2:
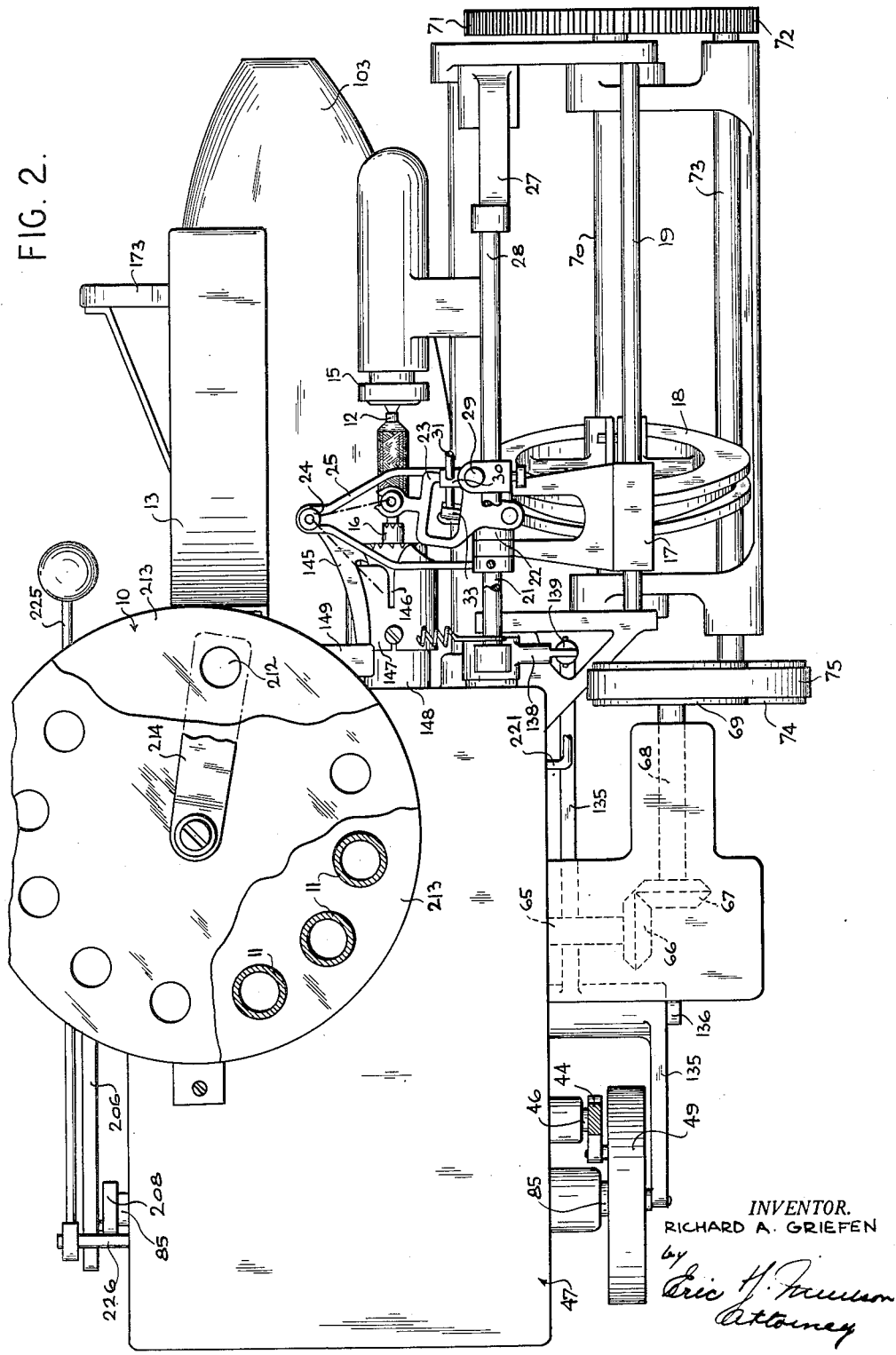
Fig. 2 is a top elevational view.

The winding of the thread continuously to and fro across the quill is accomplished by means of a traverse carriage 17 reciprocated by a traverse cam 18 which is powered by the drive-shaft of the machine as will appear more fully hereinafter by means of an intermediate belt and pulley system as shown in Fig. 1 and by means of a gear and pinion, or in any other suitable manner. Carriage 17 reciprocates on guide-rod 19 by means of a follower 20 engaged by said traverse cam 18. Said carriage extends forwardly from guiderod 19 to a traverse rod or push rod 21 and is preferably bifurcated as shown in Fig. 2, receiving between its bifurcated ends a freely rotatable mounting-element 22 which pivotally supports the thread-guide 23. In order to assure a uniform wind at the tapered ends of the quills and to prevent snagging or fouling of the thread as the quill is being wound, the thread is preferably fed to the pivoting traverse thread-guide 23 from a fixed thread-guide 24 which is supported on a holding member or yoke 25 fixed to traverse rod 21, said fixed thread-guide 24 normally overhanging said pivoting traverse thread-guide 23.

Since the quill must be wound with tapered ends so that the thread will not slough off the quill, the pivoting traverse thread-guide 23 cooperates with a taper-end attachment 26 preferably supported on a rocker frame 27 including a supporting rod 28 for adjustably positioning said attachment. The taper-end attachment operates to shorten the stroke of the traverse-guide member 23 as the diameter of the quill increases.

Figure 5:
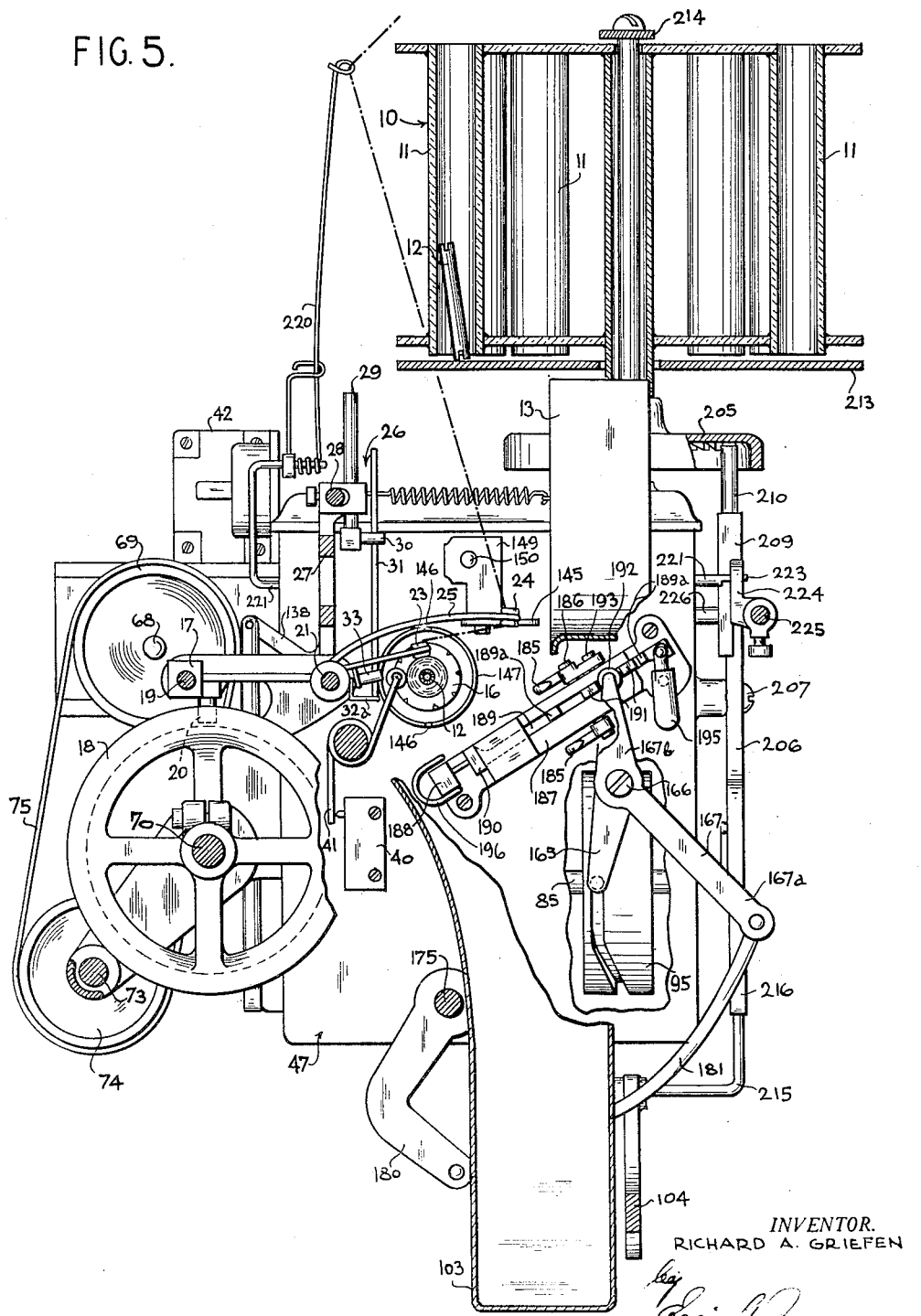
Fig. 5 is a sectional view taken on line 5—5 of Fig. 1.

As is clearly illustrated in Figs. 1, 2, 5, 25 and 26, said taper-end attachment 26 essentially comprises a traverse adjustment-rod 29 carrying a rotatable pivot 30 which slidably retains a connecting taper-end rod 31 pivotally mounted at its lower end to an extension 32a of a member 32 fixed to traverse rod 21 between the bifurcated ends of carriage 17 and the rotatable mounting element 22 so that the stroke of the lower end of the connecting rod 31 corresponds to the stroke of carriage 17. The thread-guide 23 is provided with a slotted guide member 33 which slidably engages connecting rod 31 so that the thread-guide may ride up the connecting rod as the diameter of the quill increases. It is thus apparent that this arrangement shortens the stroke of the thread-guide progressively as the quill is wound to a predetermined diameter, thereby providing the quill with tapered ends. As will be seen in the drawings, the thread is inserted first through the eye of the traverse thread-guide 23. The traverse thread-guide 23 is held to the periphery of the quill not alone by gravity but also by virtue of the sharp feeding angle of the thread as it passes through the thread-guide, as is best illustrated in Fig. 5.

Means are provided for automatically stopping the machine and ejecting the quill when a predetermined thickness of wind has been achieved. This means preferably takes the form of a momentary contact switch 40 which cooperates with a contact-member 41, which is preferably adjustable to make electrical contact at any desired quill thickness. At the point of contact the switch energizes a solenoid trigger-switch 42 (see Fig. 1) which raises trigger 43 thereby in turn pivoting change lever 44 under the influence of spring 45 and causing shaft 46 to rock for actuating the internal mechanism within the cam box 47. Said change lever 44 is preferably controlled by an inner resetting cam 48 on external cam wheel 49 and is automatically reset at the completion of one revolution of said cam wheel.

The rocking of cam lever shaft 46 starts the change cycle of operations, accomplishing the previously stated sequential steps which will now be described in detail.

Figure 10:
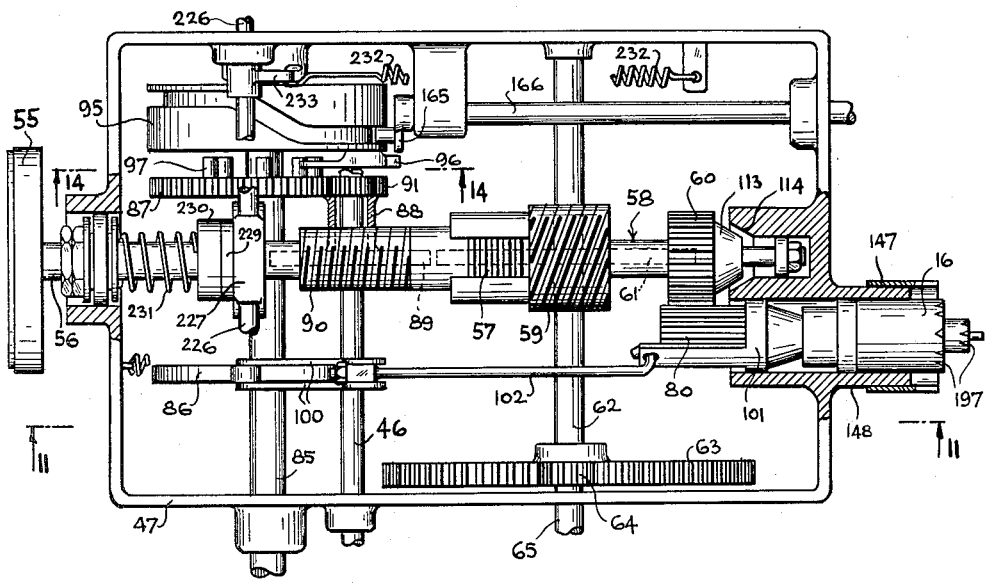
Fig. 10 is a view similar to Fig. 6 but illustrating still another system within the gearbox.
Figure 11:
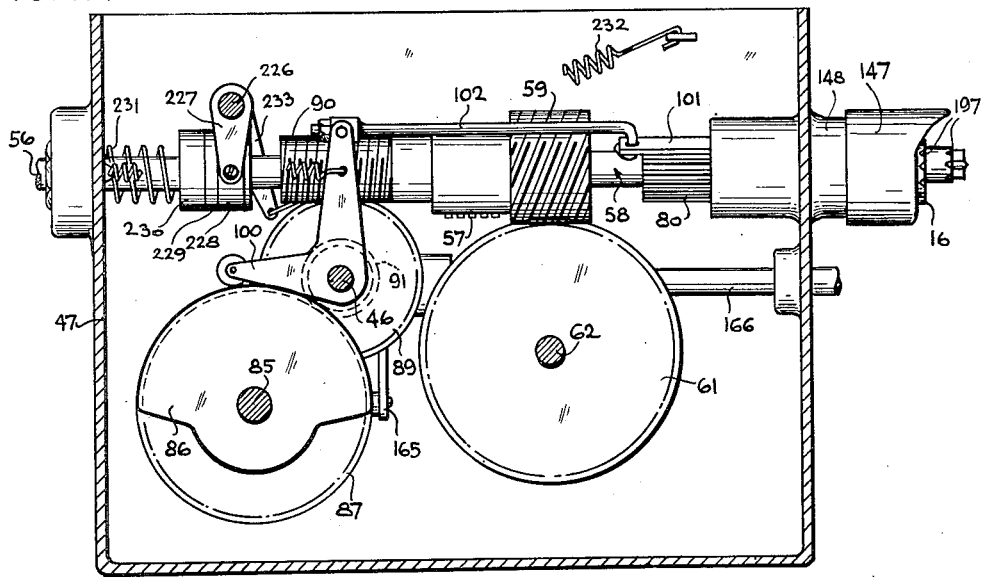
Fig. 11 is a sectional view taken on line 11—11 of Fig. 10.

Referring now to Figs. 10 and 11, power is supplied to friction disc or driven wheel 55 for the main drive-shaft 56 which is connected by means of a friction-clutch 57 to the main shaft driving element 58 preferably comprising spiral gear 59 and pinion gear 60 as a unitary structure. Spiral gear 59 meshes with a gear 61 on traverse shaft 62 which carries another gear 63 meshing with a pinion 64 on gear shaft 65. Gear shaft 65 carries a miter gear 66 which meshes with another miter gear 67 on pulley shaft 68 which carries a pulley 69, as best shown in Figs. 1 and 2.

Traverse cam 18 is mounted on cam shaft 70 suitably supported on the frame of the machine and said cam shaft carries a large gear 71 meshing with a pinion gear 72 on pinion gear shaft 73 which carries at its other end a preferably expansible pulley 74 connected to pulley 69 by means of a belt 75. Thus traverse cam 18 is driven indirectly by traverse shaft gear 61 and changes in the wind may be accomplished by adjusting expansible pulley 74 and by changing gears 71 and 72. The length of the wind may be varied by changing traverse cam 18.

Pinion gear portion 60 of driving element 58 meshes with spindle shaft gear 80 driving the retractable chuck 16.

Returning now to Figs. 10 and 11, a cam-shaft 85 carries a cam 86 for retracting the driving-chuck 16 when cam lever shaft 46 is actuated at the completion of the wind. This is accomplished as follows: Cam shaft 85 carries a freely rotatable gear wheel 87 rotating continuously with the rotation of drive shaft 56. This is accomplished by means of a preferably integral driving element 88 rotatable on cam lever shaft 46 and comprising a gear portion 89 meshing with main drive shaft worm 90 and a cam shaft drive gear portion 91 meshing with gear wheel 87. As shown in Fig. 14, cam shaft 85 also carries a drum cam 95 adjacent said gear. Said drum cam 95 carries a cam shaft starting pawl 96 normally held out of engagement with one of a plurality of pins or studs 97 fixed to cam shaft gear 87 adjacent said drum. However, the rocking of cam lever shaft 46 at the completion of the winding operation causes a cam shaft starting lever or trip lever 98 carried thereby to trip said pawl 96 against one of the studs 97 for one revolution of cam shaft 85. Said pawl is maintained in contact with said stud during this period in any preferred manner, as by means of a leaf spring 99 secured to drum cam 95. As cam shaft 85 makes one revolution a spring-biased cam lever 100 mounted on cam lever shaft 46 and connected to driving chuck spindle 101 by means of a linkage 102 cooperates with cam 86 to retract said driving chuck spindle and attached driving chuck 16. When the chuck is retracted the wound quill falls into the lower delivery chute 103 and against shutter 104.

Provision is made for stopping the rotation of driving chuck 16 prior to its retraction. This arrangement includes a brake lever 110 pivoted to cam box 47 at 111 and carrying a ball bearing or roller 112 engaged with main shaft driving element 58 between the spiral gear portion 59 and the pinion gear portion 60 thereof; said pinion gear portion having a conical braking surface 113, as indicated in Figs. 10, 12 and 13, which coacts with braking seat 114 formed in the cam box housing in order to arrest the rotation of driving chuck 16 together with traverse shaft 62 and traverse cam 18 under the influence of said brake lever 110 in a manner now to be described. Brake lever 110 is retained in the normal inoperative position of Figs. 12 and 13 accompanied by the rotation of driving chuck 16 during the winding operation by means of a cooperating pair of hooks or brake trips 115 and 116 mounted on hook shaft 117. Lower hook 116 has an extension 116a which is intermittently actuated by traverse rod 21, which it will be remembered is reciprocated simultaneously with the movement of traverse carriage 17. It will thus be seen that brake lever 110 will be released only at a time when the traverse carriage 17 and the thread is adjacent the cam box side of the machine, or the left of the machine, as viewed in Fig. 1. This arrangement is provided because the mechanism for clamping and severing the thread is disposed on the left side of the machine. As seen in Figs. 12 and 13, lower hook 116 is reset by a slotted bar 118 pivoted at one end to trip lever 98 and slidably receiving at its other end an arm 119 fixed to hook shaft 117. The purpose of this arrangement is to maintain lower hook 116 away from traverse rod 21 until the change cycle starts. Lower hook 116 is brought into position when cam shaft lever 98 moves to the left at the time trigger 43 has been tripped. The slotted bar 118 allows movement when the traverse rod 21 strikes extension 116a of lower hook 116. Spring 120 which is shown fragmentarily in Figs. 12 and 13 is attached at one end to slotted bar 118 and at its other end to arm 119 in order to allow retraction of lower hook 116 when cam shaft lever 98 is tripped.

The release of braking lever 110 and the locking of main shaft driving element 58 against braking seat 114 of the cam box housing (see Fig. 10) is accomplished by means of a braking cam 125 fixed to cam shaft 85 which engages a braking cam lever 126 mounted on cam lever shaft 46 and operatively connected at its upper end to a brake lever ram 127 slidably mounted on a trip rod 128 secured to brake lever 110. As cam 125 rotates at the completion of the winding operation, cam lever 126 carries brake lever ram 127 forwardly compressing a spring 129 against a washer or stop 130 on trip rod 128 until said brake lever ram strikes a depending tongue 115a of upper brake trip 115, thereby forcing conical portion 113 of main shaft driving element 58 against braking seat 114 to interrupt the rotation of driving chuck 16 and traverse carriage 17. It will be noted that brake lever ram 127 is spring-loaded during its advance stroke by means of spring 129 so that it will automatically return to the position of Figs. 12 and 13. Cam lever 126 is provided with a return spring 131 secured to cam box 47.

Following the interruption of rotation of driving chuck 16 and traverse cam 17 in the manner just described, rocker frame 27 is tilted back in order to raise the traverse thread guide 23 and the fixed thread guide 24 away from the wound quill in order to allow a thread catching mechanism to function prior to the clamping and severing of the thread in a manner to be fully indicated. Referring now to Figs. 1 and 16 the tilting of rocker frame 27 is accomplished by means of a rocker lever 135 pivoted to cam box 47 at 136 and actuated by the outer retractor cam 137 of external cam wheel 49. A retractor arm 138 is preferably formed integrally with rocker frame 27 and the free end of said retractor arm is operatively connected with rocker lever 135 by means of a linkage or connecting rod 139. Fig. 16 illustrates the retracted position of rocker frame 27, the taper end attachment 26, the traverse thread guide 23 and the fixed thread guide 24. As clearly shown in Fig. 13 approximately half of traverse rod 21 (that portion between traverse carriage 17 and the cam box end of the traverse rod) is formed with a square cross-section and is slidable within a retractor bushing 140 firmly fixed to rocker frame 27. Retractor bushing 140 is provided internally with a square cross-section for the slidable reception of the square portion of traverse rod 21 so that said traverse rod will be tilted back simultaneously with the retraction of rocker frame 27, thereby retracting taper end attachment 26 and fixed thread guide 24 mounted on holding yoke 25 secured to traverse rod 21, and also carrying therewith traverse thread guide 23 supported on freely rotatable mounting element 22.

After rocker frame 27 has been tilted back carrying the traverse thread guide 23 and fixed thread guide 24 clear of the quill station and after the driving chuck 16 has been retracted by the operation of quill-releasing cam 86 to drop the wound quill into the lower delivery chute 103, a thread catching finger 145 operates to bring the thread into diametrical guide-slots 146 in a guide member or shield 147 disposed about the chuck socket 148, as clearly shown in Figs. 8 and 9. Finger 145 is preferably pivotally supported on a holder 149 carried by a sliding rod 150 and normally urged forwardly as shown in dotted outline in Fig. 8 by means of a spring 151. Sliding rod 150 is supported by a guiding sleeve 152 and connected to a lever system comprising upper cam lever 153, lower lever 154 and intermediate connecting lever 155, said levers being actuated by a suitable thread catcher cam 156 mounted on cam shaft 85. A spring 157 is attached to cam lever 153 to facilitate advancement of sliding rod 150 and finger 145. Upon its return stroke finger 145 bring the thread into the guide-slots 146 of guide member 147 prior to the disposition of a fresh quill at the winding station by the carrier mechanism 14 and prior to the clamping of the thread between the advancing driving chuck 16 and the freshly positioned quill. At the extreme end of its return stroke thread catching finger 145 is pivoted rearwardly to release the thread by the abutment of an integral lug 145a thereof against the wall of the cam box. The release of the thread by finger 145 does not occur until the thread has been securely clamped at two spaced points and severed by a knife attached to the retractable carrier mechanism, as will appear more fully hereinafter.

Figure 3:
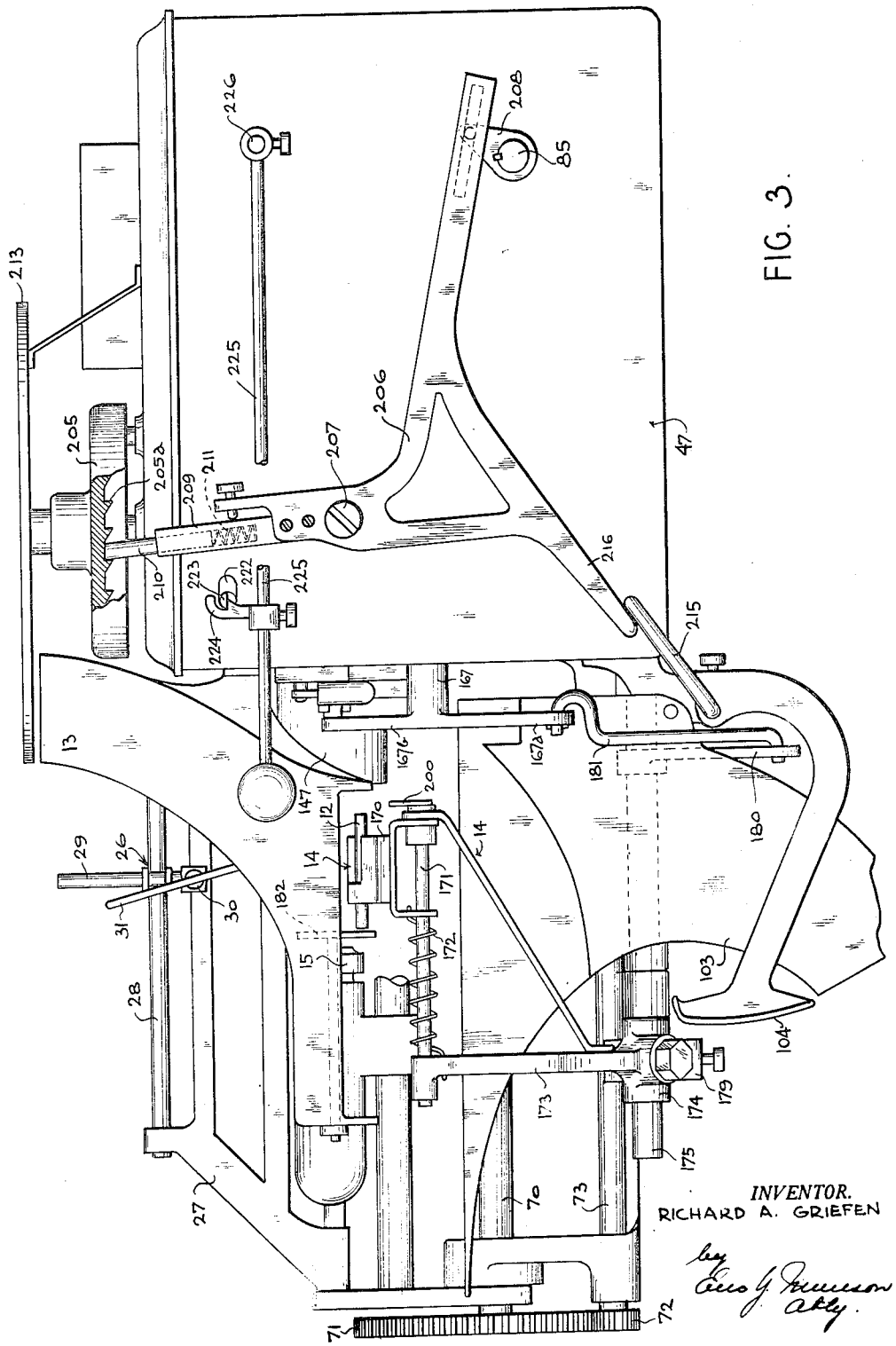
Fig. 3 is a rear elevational view.
Figure 4:
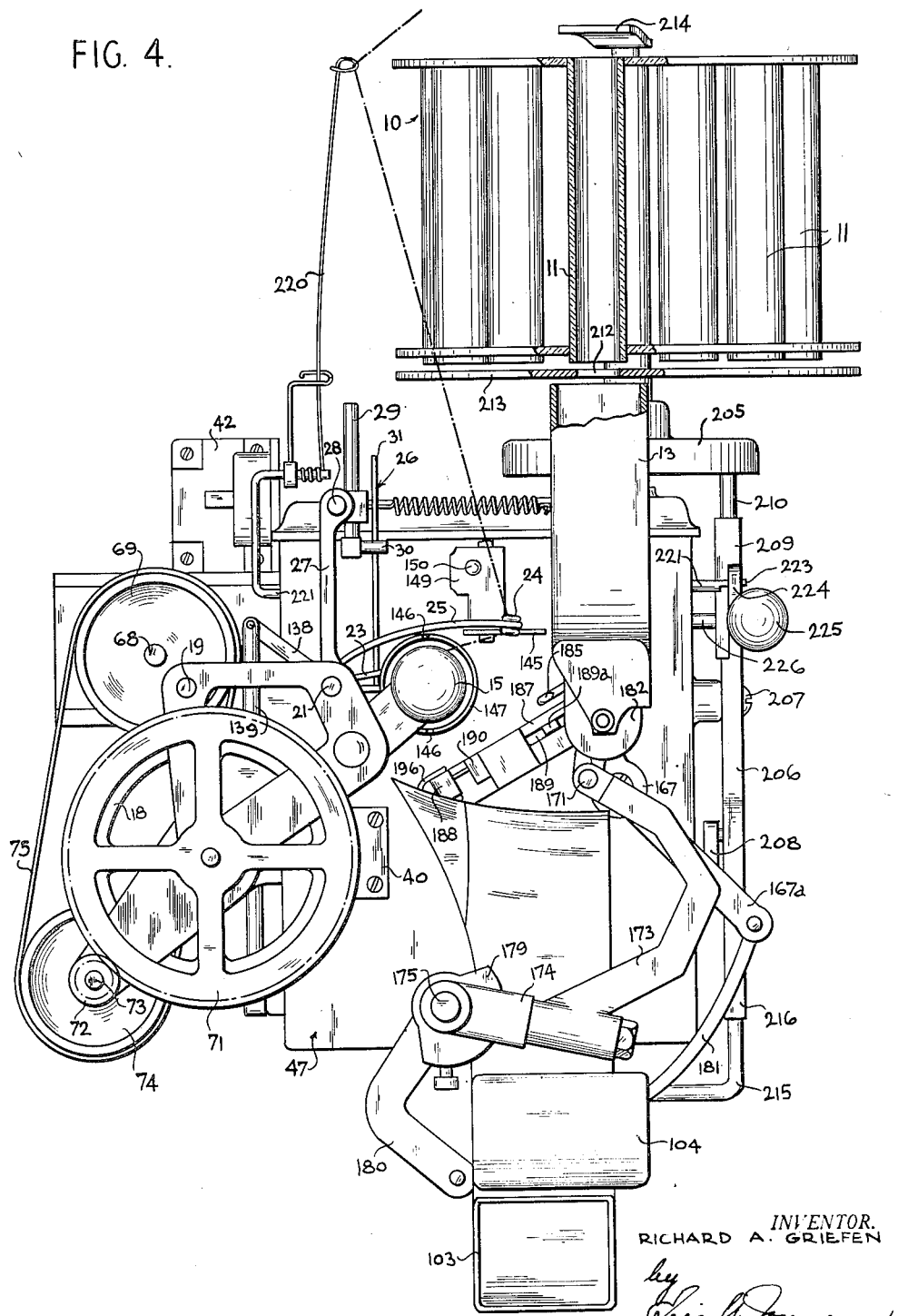
Fig. 4 is a side elevational view.

A quill carrier mechanism generally designated by reference numeral 14 is actuated by means of the cam drum 95 on cam shaft 85 referred to hereinabove through the agency of a cam roller arm 165 fixed to a shaft or stud 166 supported within cam box 47, as best seen in Figs. 5 and 10. Shaft 166 carries externally of the cam box a swing arm 167 having an upper branch 167b operatively connected to a thread clamping mechanism to be described and a lower branch 167a operatively connected to the quill carrier mechanism 14. Said quill carrier mechanism includes a quill carrier 170 slidably and pivotally mounted on a support rod 171 by means of a spring 172 also carried on said rod, as best shown in rear elevation in Fig. 3 and in Figs. 15 to 17. Support rod 171 is mounted at the upper end of a quill carrier arm 173, the lower end of which is preferably formed as a forked bearing element 174 which rides on a pivot-shaft 175 suitably mounted in a bearing (not shown) secured to the cam box 47 or the frame of the machine. Bearing element 174 of carrier arm 173 carries a plunger 176 normally urged by means of a spring 177 against a depression 178 in a plunger cam 179 fixed to pivot shaft 175, said plunger cam being received within the forks of bearing element 174, as best illustrated in Fig. 16. A bracket 180 is fixed to pivot-shaft 175 adjacent cam box 47 (see Figs. 3 and 16), said bracket being connected to lower branch 167a of swing arm 167 by means of a connecting link 181. The arrangement thus provides a safety feature in the event that the quill carrier 170 and carrier arm 173 become jammed by precluding damage to the internal mechanism related to the actuation of the quill carrier. As shown in Fig. 3 an adjustable spacing or guide member 182 is provided adjacent quill carrier 170 on upper feeding chute 13 for properly positioning the quill as it is dropped upon the quill carrier.

Clamping means are provided for securely engaging the thread prior to its being severed and said clamping means are actuated by the upper branch 167b of swing arm 167 which also serves to position a fresh quill at the winding station on quill carrier 170 in the manner just described. The clamping operation is synchronized with the thread catching operation in such a manner that as the thread is carried toward the clamping mechanism by the thread catching finger 145 it will be engaged by a pair of swingable thread guides 185 and urged toward the clamping jaws of the clamping mechanism as will now be described with reference to Fig. 5 and Figs. 15 to 17, the initial stage of the clamping operation being illustrated in Fig. 15.

Thread guides 185 are preferably pivoted at 186 on clamp base 187 which carries at its forward end a fixed jaw 188. Clamp drive 189 is slidably mounted on clamp base 187 and carries at its forward end a clamping hammer 190 which coacts with fixed jaw 188 to secure the thread prior to its being severed. Clamp slide 191 rides on clamp drive 189 and is preferably forked to receive a roller 192 secured to branch 167b of actuating swing arm 167. A guide pin 193 fixed to clamp slide 191 engages a slot 194 in the base of upper thread guide 185 for rotating the thread guides and bringing the thread between clamp jaw 188 and clamping hammer 190 as said clamp slide advances under the actuation of swing arm 167. Clamp drive 189 is formed with oppositely disposed end stops 189a against which clamp slide 191 abuts toward the end of its advance stroke and return stroke. A toggle element 195 is secured to the rearward end of clamp drive 189 and an auxiliary wire guide 196 serves to aid in locating the thread in clamping position.

Thus as the thread is brought into clamping position by thread guides 185, clamp drive 189 has been moving forward and will finally snap shut on the thread as it reaches the peak of toggle 195, thereby allowing a time interval for the thread to enter between jaw 188 and hammer 190. In the initial stage of the clamping operation illustrated in Fig. 15, the driving chuck 16 is still retracted within the cam box 47. In the next stage of the operation the chuck advances to operative position as shown in Fig. 17 clamping the thread between the chuck and the newly positioned quill. In order to facilitate this result, the peripheral edge of the chuck is provided with a plurality of pairs of diametrically opposed recesses or V-slots 197. Since the thread is initially aligned within the diametrically opposed slots 146 of guide member 147 by thread catcher 145, the advancing chuck will readily engage the thread within a pair of V-slots 197 and against the end of the quill. With the thread securely held at two points, as shown in Fig. 17, the quill carrier mechanism 14 retracts and a knife 200 carried by supporting rod 171 cuts the thread. As clamp slide 191 retracts thread guides 185 return. Clamp drive 189 retracts also with the abutment of clamp slide 191 against the rear endstop 189a thereof but the retraction of said clamp drive 189 and clamping hammer 190 does not occur until the thread has been severed.

Following the severing of the thread the retraction cam 137 of external cam wheel 49 resets the rocker frame 27 and lowers the traverse thread guide 23 against the empty quill. The braking cam 125 then returns the brake lever 110 engaging the clutch 57 on main drive shaft 56, recommencing the rotation of main shaft driving element 58 to drive the chuck 16 and the traverse carriage 17.

Provision is made for the stepwise rotation of a magazine ratchet 205 in order to advance the magazine 10 for dropping a fresh quill upon the quill carrier 170. This arrangement preferably takes the form of a magazine swing arm 206 pivoted at 207 to the rear of cam box 47, as seen in Fig. 3 and actuated by a crank 208 fixed to the protruding end of cam shaft 85. Magazine arm 206 is provided at the top portion thereof with an adjustable holder 209 for a plunger 210 urged by a spring 211 against the ratchet teeth 205a of magazine ratchet 205. The swinging of arm 206 indexes one of the magazine compartments 11 with a hole 212 in a selector plate 213 (see Fig. 4), thereby dropping a fresh quill into feed chute 13 and onto quill carrier 170. The magazine parts are preferably made of transparent material to facilitate loading the compartments 11 and a guard 214 prevents the inadvertent insertion of a quill into the indexed magazine compartment. Simultaneously with the positioning of a fresh quill on the quill carrier, the lower delivery chute shutter 104 is raised by means of an arm 215 extending into engagement with an extension 216 of magazine swing arm 206, thereby dropping the previously wound quill into a suitable receptacle (not shown).

Figure 6:
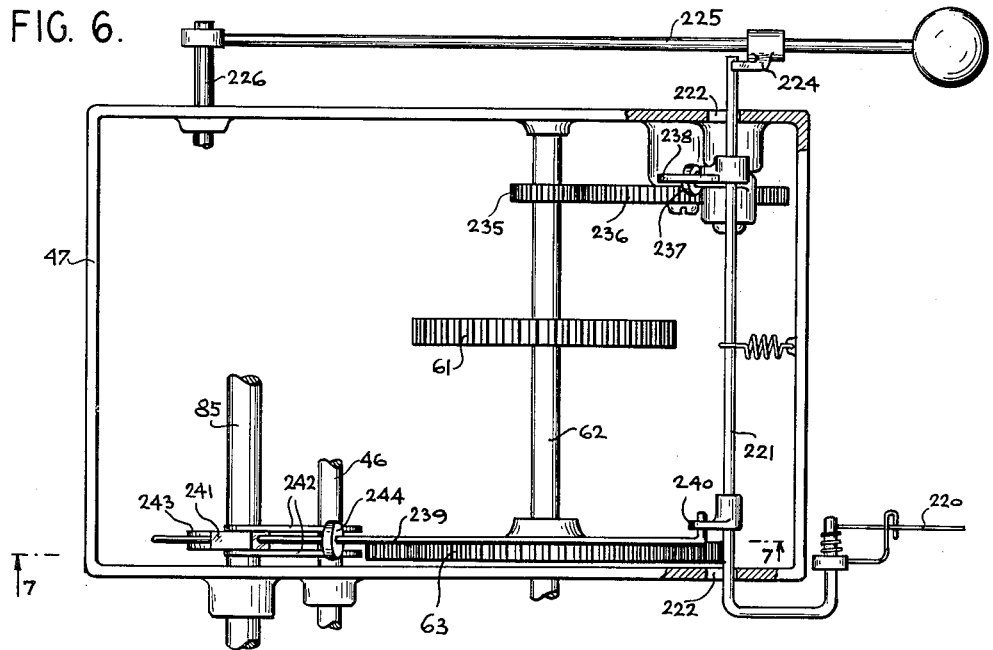
Fig. 6 is a top plan view of the gearbox of the machine with the cover removed.
Figure 7:
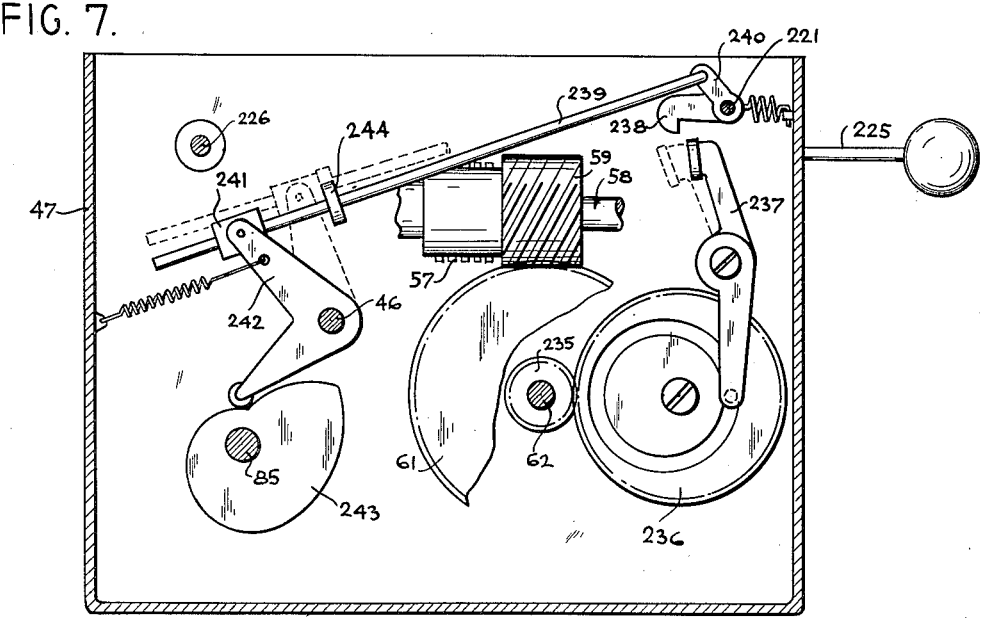
Fig. 7 is a sectional view taken on line 7—7 of Fig. 6.

Another feature of the invention is the provision of an emergency tripping device actuated whenever the thread breaks, so that the operation of the machine will be automatically interrupted. This arrangement is illustrated in Figs. 6 and 7, wherein it will be seen that the elevated wire guide 220 is mounted on a stop-motion rod 221 extending internally of the cam box 47 through the elongated slots or bearings 222. Stop-motion rod 221 projects rearwardly of cam box 47 and is formed with a preferably hemicylindrical projection or tripping catch 223 (see Fig. 3) which engages the catch 224 of the start-stop lever 225. Referring back to Figs. 10 and 11, start-stop lever 225 is fixed to a horizontal shaft 226 carrying a fork 227 which supports a sleeve 228 suitably disposed on main drive shaft 56 for anti-frictional rotation of said drive shaft as by means of a thrust bearing 229 and bearing spacer and spacer member 230. Main shaft spring 231 is disposed between cam box 47 and spacer member 230. Thus when stop motion rod 221 releases tripping catch 224 in the event of inadvertent rupture of the thread, the stop-start lever 225 will swing upwardly under the influence of main shaft spring 231 and spring 232 which is secured to spring bracket 233 mounted on horizontal shaft 226, thereby disengaging the friction disc or driven wheel 55 from a driving wheel (not shown) and interrupting the rotation of the drive shaft 56.

Of course, lever 225 may be operated independently of the stop-motion mechanism, in order to stop and start the machine simply by manipulating lever catch 224 into and out of engagement with the tripping catch 223 of stop-motion rod 221.

The manner in which stop-motion rod 221 operates to release start-stop lever 225 is clearly illustrated in Figs. 6 and 7. Transverse shaft 62 carries a pinion 235 which drives an eccentric gear 236 actuating an oscillating tripper 237, thus if the thread being fed through wire guide 220 should rupture, stop-motion rod 221 would rotate slightly in a counter-clockwise direction induced by over balance toward that side, thereby lowering stop-motion catch 238 into the path of oscillating tripper 237 to displace stop-motion rod 221 laterally to the left within its elongated bearing slots 222, whereupon stop-start lever 225 would be released to interrupt the rotation of the main drive shaft 56 in the manner described above.

Provision is made for arresting the stop-motion rod 221 in order to prevent interruption of the operation of the machine as a result of slackness in the thread during the change cycle. For this purpose a cam actuated push rod 239 is secured to stop-motion rod 221 by means of a support 240. The free end of said push rod is slidably retained in a block 241 pivotally supported at the upper end of a spring-biased cam lever 242 mounted on cam lever shaft 46 and engaging a suitable cam 243 fixed on cam shaft 85. As cam 243 rotates block 241 is carried against a collar or stop 244 in push rod 239, thereby arresting stop-motion rod 221 in its inoperative position during the change cycle of the machine.

As external cam wheel 49 completes one revolution the inner resetting cam 48 thereof returns change lever 44 to the position of Fig. 1 thereby causing cam shaft starting lever to re-engage cam shaft starting pawl 96 and terminating the rotation of cam shaft 85 and the change cycle of the machine. Solenoid trigger 43 then falls back into place holding change lever 44 until the fresh quill has been wound to the desired diameter whereby the change cycle is recommenced.

The initial embodiment of the invention is adapted for driving straight quills having diametrical end slots and in this connection it is desirable to provide the drivnig chuck 16 with a retractable driving tip or blade, as shown in Fig. 23. The driving chuck, designated generally by reference numeral 16, is accordingly provided with a retractable driving blade 250 normally urged outwardly by means of a spring 251 interposed between said driving blade and the end of spindle driving shaft 252. Blade 250 may also be formed with a central locating pin 253. Thus as driving chuck 16 advances during the change cycle of the machine, locating pin 253 centers the quill retained on quill carrier 170 and driving blade 250 retracts until it registers with the diametrical quill slot upon rotation of the driving chuck as the winding operation commences. The driving blade 250 must, of course, be held against rotation within the chuck 16 and this may be accomplished in any desired manner.

Figs. 18 to 20 illustrate a modification of the invention for winding head quills having flanged ends. Like numerals are used for like parts with respect to the initial embodiment and only the distinguishing features of the second modification need be described since the operation of the machine is similar to that hereinabove described.

Since the quills 260 to be wound have flanged ends 261, the wound thread will be securely retained by said flanged ends and the taper end attachment 26 is not required, nor is the rocker frame 27 required since the thread may be fed to the flanged quill from a point above the quill, as shown in Fig. 19. A traverse carriage 262 is driven by traverse shaft 265 through gear transmission case 266. Traverse carriage 262 is slidable on guide rod 267 and extends forwardly to traverse rod 268 which has the same function as traverse rod 21 of the initial embodiment. Traverse rod 268 however is circular in cross-section throughout its length since it is not required to lift any thread guiding elements.

A thread guide arm 269 is pivotally mounted between a pair of supports 270 preferably integral with traverse carriage 262. Thread guide arm 269 is preferably adjustable vertically and horizontally with respect to carriage 262. Vertical adjustment is assured by means of an adjustment pin 271 carrying a spring 272 normally urging the rear portion of arm 269 upwardly, said pin carrying an adjustment nut 273. Horizontal adjustment is effected by means of another knurled nut 274 mounted on pivot-stud 275 and projecting through a slot in arm 269 so as to displace said arm either to the right or the left, as clearly shown in Figs. 19 and 20. External cam wheel 49 is provided as in the initial embodiment but is here provided only with an inner resetting cam 48 for change lever 44. In other respects the change cycle and operation of the machine is similar to that originally described.

Figure 22:
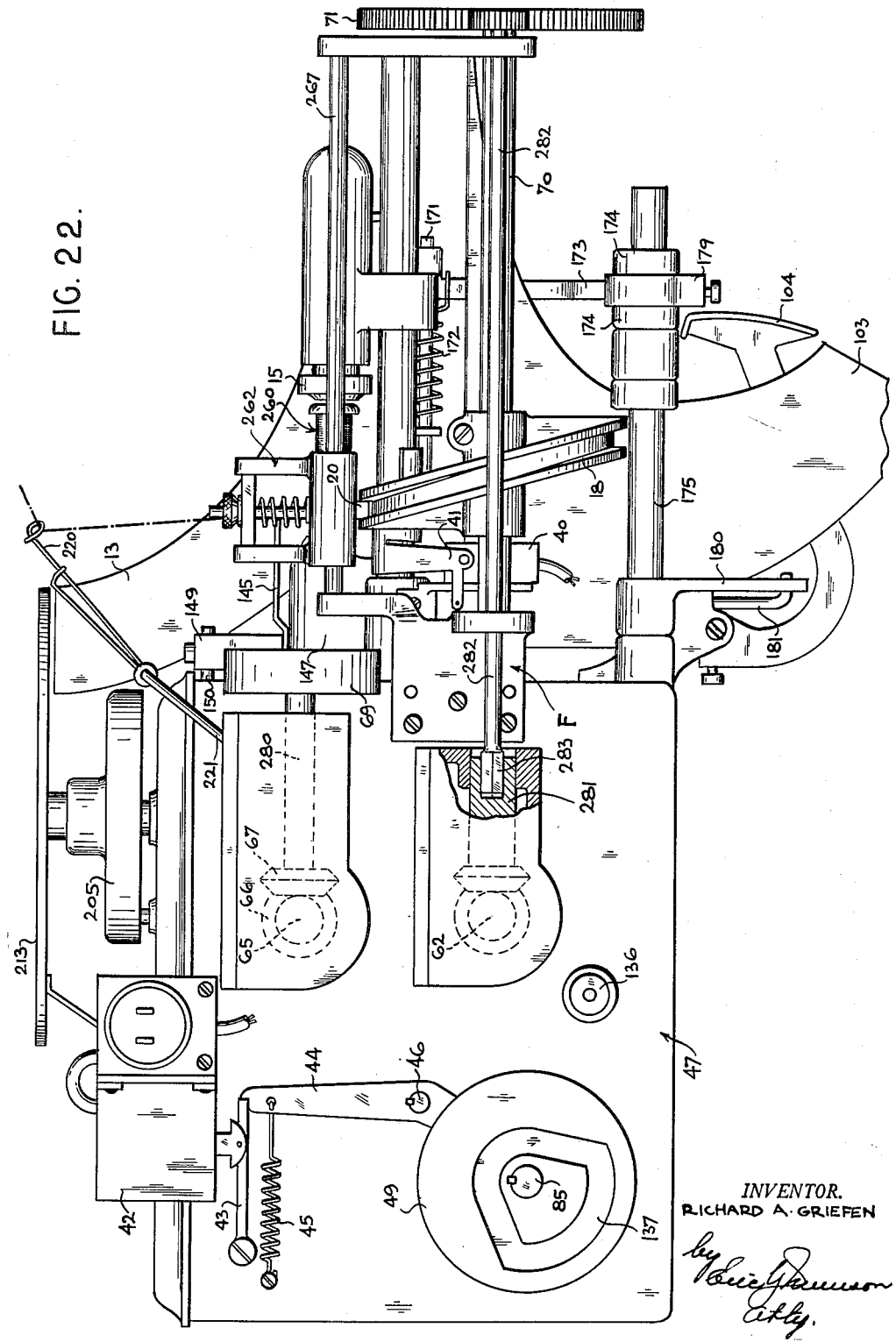

Figs. 21 and 22 are front elevational views of a further modification of the machine adapted for selectively winding either straight quills or flanged quills. The arrangement involves the use of a pair of interchangeable attachments which may be substituted for each other depending upon the type of quill being wound. Fig. 21 illustrates the machine fitted with the attachment S for winding straight quills, the arrangement of parts corresponding to the original embodiment, with like reference numerals being applied to like parts. The machine here employs an upper drive shaft 280 and a lower drive shaft 281. When attachment S is being used for winding straight quills upper drive shaft 280 is functional. On the other hand when attachment F is used for winding flanged quills, as shown in Fig. 22, lower drive shaft 281 is functional. In the latter case driving connection with a pinion shaft 282 is established by provision of a terminal shaft plug 283 insertable within a suitable socket in lower drive shaft 281. Retractor lever 135 is not required in winding flanged quills and may therefore be removed from pivot boss 136, as shown in Fig. 22.

Since certain additional modifications may be made in the winding device of the present invention without departing from the scope thereof, it is intended that all matter contained in the foregoing description and shown in the accompanying drawing be interpreted merely as illustrative and not in a limiting sense.

What is claimed is:

1. In an automatic machine for the continuous traverse winding of quills, bobbins and the like, and having a quill change cycle, a traverse carriage reciprocable in a direction parallel to the longitudinal axis of the quill, pivoted thread guide means carried by said carriage, a retractable driving member for said quills, a solenoid switch actuating the change cycle of the machine, a quill contact member adjustable for a predetermined wind thickness, whereby to momentarily energize said solenoid for initiating the change cycle of the machine, positioning means for disposing quills in operative position at the winding station, a thread catching mechanism synchronized with said retractable driving member, whereby to firmly secure the thread between the advancing driving member and a fresh quill, independent clamping means for fixing the thread at a point remote from said driving member, said positioning means having a cutting knife operable to sever the thread held between said clamping mechanism and said driving chuck and quill, and an auxiliary guiding member surrounding said driving member for alignment of said thread.

2. In an automatic machine for the continuous traverse winding of quills, bobbins and the like, and having a quill change cycle, a traverse carriage reciprocable in a direction parallel to the longitudinal axis of the quill, a rocker frame, thread guide means carried by said rocker frame, a trip member actuating the change cycle of the machine at a predetermined wind thickness, a retractable driving member for said quills, braking means for said retractable driving member, clamping means for fixing the thread at a point removed from said driving member, trip means associated with said braking means, and a traverse rod carried by said traverse carriage, said traverse rod being operable to release said trip means when said traverse carriage is adjacent said clamping means.

3. In an automatic machine for the continuous traverse winding of quills, bobbins and the like, and having a quill change cycle, a traverse carriage reciprocable in a direction parallel to the longitudinal axis of the quill, a rocker frame, a traverse rod reciprocable with said carriage, thread guide means rotatable upon said traverse rod, a taper-end rod extending from a fixed point on said rocker frame into pivotal engagement with said carriage, said thread guide means being slidable along said taper-end rod, a retractable driving member for said quills, braking means for said retractable driving member, trip means associated with said braking means, and clamping means for fixing the thread at a point remote from said driving member, said traverse rod being operable to release said trip means when said traverse carriage is adjacent said clamping means.

4. In an automatic machine for the continuous traverse winding of quills, bobbins and the like, and having a quill change cycle, a traverse carriage reciprocable in a direction parallel to the longitudinal axis of the quill, a rocker frame, thread guide means carried by said rocker frame, a trip member actuating the change cycle of the machine at a predetermined wind thickness, a retractable driving member for said quills, braking means for said retractable driving member, clamping means for fixing the thread at a point removed from said driving member, trip means associated with said braking means, and a traverse rod carried by said traverse carriage, said traverse rod being operable to release said trip means when said traverse carriage is adjacent said clamping means, and retractable positioning means for disposing quills in operative position at the winding station of the machine, said positioning means having a cutter element operable to sever the clamped thread upon retraction of said positioning means.

5. In an automatic machine for the continuous traverse winding of quills, bobbins and the like, and having a quill change cycle, a traverse carriage reciprocable in a direction parallel to the longitudinal axis of the quill, a rocker frame, a traverse rod reciprocable with said carriage, thread guide means rotatable upon said traverse rod, a taper end rod extending from a fixed point on said rocker frame into pivotal engagement with said carriage, said thread guide means being slidable along said taper end rod, a retractable driving member for said quills, braking means for said retractable driving member, trip means associated with said braking means, and clamping means for fixing the thread at a point remote from said driving member, said traverse rod being operable to release said trip means when said traverse carriage is adjacent said clamping means, and retractable positioning means for disposing quills in operative position at the winding station of the machine, said positioning means having a cutter element operable to sever the clamped thread upon retraction of said positioning means.

6. In an automatic machine for the continuous traverse winding of quills, bobbins and the like, and having a quill change cycle, a traverse carriage reciprocable in a direction parallel to the longitudinal axis of the quill, a rocker frame, thread guide means carried by said rocker frame, solenoid trip means governing the change cycle of the machine, an adjustable contact member for momentarily energizing said solenoid trip means, a retractor element secured to said rocker frame and operable to retract said rocker frame and thread guide means away from the winding station during the change cycle of the machine, a retractable driving member for said quills, and a thread catching mechanism operable to carry the thread toward said driving member upon the retraction of said rocker frame.

7. In an automatic machine for the continuous traverse winding of quills, bobbins and the like, and having a quill change cycle, a traverse carriage reciprocable in a direction parallel to the longitudinal axis of the quill, a rocker frame, thread guide means carried by said rocker frame, solenoid trip means governing the change cycle of the machine, an adjustable contact member for momentarily energizing said solenoid trip means, a retractor element secured to said rocker frame and operable to retract said rocker frame and thread guide means away from the winding station during the change cycle of the machine, a retractable driving member for said quills, and a thread catching mechanism operable to carry the thread toward said driving member upon the retraction of said rocker frame, and clamping means for fixing the thread at a point removed from said driving member, said clamping means having thread guiding elements for conducting the thread into clampable engagement therewith.

8. In an automatic machine for the continuous traverse winding of quills, bobbins and the like, and having a quill change cycle, a traverse carriage reciprocable in a direction parallel to the longitudinal axis of the quill, a rocker frame, thread guide means carried by said rocker frame, solenoid trip means governing the change cycle of the machine, an adjustable contact member for momentarily energizing said solenoid trip means, a retractor element secured to said rocker frame and operable to retract said rocker frame and thread guide means away from the winding station during the change cycle of the machine, a retractable driving member for said quills, and a thread catching mechanism operable to carry the thread toward said driving member upon the retraction of said rocker frame, and braking means for said retractable driving member, clamping means for fixing the thread at a point removed from said driving member, and trip means normally retarding said breaking means, said trip means being releasable when said traverse carriage is adjacent said clamping means.

9. In an automatic machine for the continuous traverse winding of quills, bobbins and the like, and having a quill change cycle, a traverse carriage reciprocable in a direction parallel to the longitudinal axis of the quill, pivoted thread guide means carried by said carriage, a retractable driving member for said quills, electric switch means governing the change cycle of the machine, a quill contact member adjustable for a predetermined wind thickness and electrically connected with said switch means, whereby to momentarily energize said switch means for initiating the change cycle of the machine, positioning means for disposing quills in operative position at the winding station, a thread catching mechanism synchronized with said retractable driving member, whereby to firmly secure the thread between the advancing driving member and a fresh quill, independent clamping means for fixing the thread at a point remote from said driving chuck, said positioning means having a cutting element operable to sever the thread held between said clamping mechanism and said driving chuck and quill, and an auxiliary guiding member surrounding said driving member for alignment of said thread, said guiding member having a pair of diametrically opposed guide slots for the reception of the thread during the retraction of said driving member.

10. In an automatic machine for the continuous traverse winding of quills, bobbins and the like, and having a quill change cycle, a traverse carriage reciprocable in a direction parallel to the longitudinal axis of the quill, a rocker frame, thread guide means carried by said rocker frame, a trip member actuating the change cycle at a predetermined wind thickness, a retractable driving member for said quills, positive braking means for said retractable driving member, clamping means for fixing the thread at a point removed from said driving member, trip means associated with said braking means, a traverse rod carried by said traverse carriage, said traverse rod being operable to release said trip means when said traverse carriage is adjacent said clamping means, and an auxiliary guiding member surrounding said driving member for alignment of said thread.

11. In an automatic machine for the continuous traverse winding of quills, bobbins and the like, and having a quill change cycle, a traverse carriage reciprocable in a direction parallel to the longitudinal axis of the quill, a rocker frame, thread guide means carried by said rocker frame, a trip member actuating the change cycle at a predetermined wind thickness, a retractable driving member for said quills, positive braking means for said retractable driving member, clamping means for fixing the thread at a point removed from said driving member, trip means associated with said braking means, a traverse rod carried by said traverse carriage, said traverse rod being operable to release said trip means when said traverse carriage is adjacent said clamping means, and an auxiliary guiding member surrounding said driving member for alignment of said thread, said guiding member having a pair of diametrically opposed guide slots for the reception of the thread during the retraction of said driving member.

12. In an automatic machine for the continuous traverse winding of quills, bobbins and the like, and having a quill change cycle, a traverse carriage reciprocable in a direction parallel to the longitudinal axis of the quill, a rocker frame, thread guide means carried by said rocker frame, solenoid trip means governing the change cycle of the machine, an adjustable quill contact member electrically connected with said trip means for momentarily energizing said trip means at a predetermined wind thickness in order to initiate the change cycle of the machine, a retractor element secured to said rocker frame and operable to retract said rocker frame and thread guide means away from the winding station during the change cycle of the machine, a retractable driving member for said quills, a thread catching mechanism operable to carry the thread toward said driving member upon the retraction of said rocker frame, and an auxiliary guiding member surrounding said driving member for alignment of said thread.

13. In an automatic machine for the continuous traverse winding of quills, bobbins and the like, and having a quill change cycle, a traverse carriage reciprocable in a direction parallel to the longitudinal axis of the quill, a rocker frame, thread guide means carried by said rocker frame, solenoid trip means governing the change cycle of the machine, an adjustable quill contact member electrically connected with said trip means for momentarily energizing said trip means at a predetermined wind thickness in order to initiate change cycle of the machine, a retractor element secured to said rocker frame and operable to retract said rocker frame and thread guide means away from the winding station during the change cycle of the machine, a retractable driving member for said quills, a thread catching mechanism operable to carry the thread toward said driving member upon the retraction of said rocker frame, and an auxiliary guiding member surrounding said driving member for alignment of said thread, said guiding member having a pair of diametrically opposed guide slots for the reception of the thread during the retraction of said driving member.

14. In an automatic machine for the continuous traverse winding of quills, bobbins and the like, and having a quill change cycle, a traverse carriage reciprocable in a direction parallel to the longitudinal axis of the quill, a rocker frame, thread guide means carried by said rocker frame, a trip member governing the change cycle of the machine at a predetermined wind thickness, a retractable driving member for said quills, positive braking means for said retractable driving member, clamping means for fixing the thread at a point removed from said driving member, trip means associated with said braking means, and a traverse rod carried by said traverse carriage, said traverse rod being operable to release said trip means when said traverse carriage is adjacent said clamping means, retractable positioning means for disposing quills in operative position at the winding station of the machine, said positioning means having a cutter element operable to sever the clamped thread upon retraction of said positioning means, and an auxiliary guiding member surrounding said driving member for alignment of said thread.

15. In an automatic machine for the continuous traverse winding of quills, bobbins and the like, and having a quill change cycle, a traverse carriage reciprocable in a direction parallel to the longitudinal axis of the quill, a rocker frame, thread guide means carried by said rocker frame, a trip member governing the change cycle of the machine at a predetermined wind thickness, a retractable driving member for said quills, positive braking means for said retractable driving member, clamping means for fixing the thread at a point removed from said driving member, trip means associated with said braking means, and a traverse rod carried by said traverse carriage, said traverse rod being operable to release said trip means when said traverse carriage is adjacent said clamping means, retractable positioning means for disposing quills in operative position at the winding station of the machine, said positioning means having a cutter element operable to sever the clamped thread upon retraction of said positioning means, and an auxiliary guiding member surrounding said driving member for alignment of said thread, said guiding member having a par of diametrically opposed guide slots for the reception of the thread during the retraction of said driving member.

RICHARD A. GRIEFEN.

REFERENCES CITED

The following references are of record in the file of this patent:

UNITED STATES PATENTS

| Number | Name | Date |
|---|---|---|
| 1,900,480 | Bartholomew | Mar. 7, 1938 |
| 2,242,660 | Reiners et al. | May 20, 1941 |
| 2,247,718 | Treckmann | July 1, 1941 |
| 2,302,715 | Reynolds et al. | Nov. 24, 1942 |
| 2,361,813 | Beckman | Oct. 31, 1944 |
| 2,449,328 | Schweiter | Sept. 14, 1948 |
| 2,475,895 | Hill | July 12, 1949 |